(12) United States Patent
Boysen, III et al.

(10) Patent No.: US 9,553,475 B2
(45) Date of Patent: Jan. 24, 2017

(54) WEARABLE MOBILE DEVICE CHARGER

(71) Applicant: Sol Cuff Technologies, LLC, Cedar Park, TX (US)

(72) Inventors: Lawrence Boysen, III, Cedar Park, TX (US); Mark W. M. Vaughan, Muskogee, OK (US)

(73) Assignee: Sol Cuff Technologies, LLC, Cedar Park, TX (US)

( * ) Notice: Subject to any disclaimer, the term of this patent is extended or adjusted under 35 U.S.C. 154(b) by 190 days.

(21) Appl. No.: 14/310,791

(22) Filed: Jun. 20, 2014

(65) Prior Publication Data

US 2014/0375246 A1  Dec. 25, 2014

Related U.S. Application Data

(60) Provisional application No. 61/837,177, filed on Jun. 20, 2013, provisional application No. 61/929,105, filed on Jan. 19, 2014.

(51) Int. Cl.
*H02J 7/00* (2006.01)
*H02J 7/02* (2016.01)
(Continued)

(52) U.S. Cl.
CPC ............... *H02J 7/025* (2013.01); *H02J 5/005* (2013.01); *H02J 7/0042* (2013.01); *H02J 7/0045* (2013.01);
(Continued)

(58) Field of Classification Search
CPC ........................................................ H02J 7/35
(Continued)

(56) References Cited

U.S. PATENT DOCUMENTS

| D324,579 S | 3/1992 | Crabtree, Jr. | |
| 6,285,757 B1 * | 9/2001 | Carroll | H04B 1/385 345/619 |

(Continued)

OTHER PUBLICATIONS

International Search Report and Written Opinion from PCT/US14/43470, issued Oct. 29, 2014, Sol Cuff Technologies, pp. 1-13.
(Continued)

*Primary Examiner* — Suresh Memula
(74) *Attorney, Agent, or Firm* — Meyertons, Hood, Kivlin, Kowert & Goetzel, P.C.; Eric B. Meyertons (57) ABSTRACT

A wireless charging device may be worn as a wristband wearable on a user's wrist. The device includes one or more energy collection components located on the wristband. The energy collection components may collect ambient energy and convert the ambient energy to electrical energy. One or more energy storage components located on the wristband and electrically coupled to the energy collection components may store at least some of the electrical energy from the energy collection components. One or more energy transmission components may be located on the wristband and electrically coupled to the energy collection components and the energy storage components. The energy transmission components may wirelessly couple with a mobile device to wirelessly transmit at least some of the collected electrical energy to the mobile device for charging a battery on the mobile device.

20 Claims, 5 Drawing Sheets

(51) Int. Cl.
*H02J 5/00* (2016.01)
*H02J 7/35* (2006.01)
*H02J 7/34* (2006.01)

(52) U.S. Cl.
CPC ............ *H02J 7/0047* (2013.01); *H02J 7/0054* (2013.01); *H02J 7/345* (2013.01); *H02J 7/355* (2013.01)

(58) Field of Classification Search
USPC .......................................................... 320/101
See application file for complete search history.

(56) References Cited

U.S. PATENT DOCUMENTS

| | | | |
|---|---|---|---|
| 7,453,217 | B2 | 11/2008 | Lys et al. |
| 8,219,140 | B2 | 7/2012 | Jacobs et al. |
| 8,235,524 | B2 | 8/2012 | Waters |
| 2003/0209604 | A1 | 11/2003 | Harrison, Jr. |
| 2007/0069684 | A1 | 3/2007 | Ramsden |
| 2007/0114967 | A1 | 5/2007 | Peng |
| 2010/0194334 | A1 | 8/2010 | Kirby et al. |
| 2010/0308725 | A1 | 12/2010 | Trzecieski |
| 2012/0170423 | A1 | 7/2012 | Fujisawa |
| 2012/0306282 | A1 | 12/2012 | Tan et al. |
| 2014/0084860 | A1* | 3/2014 | Jaax .......................... A61N 1/08 320/108 |
| 2014/0159638 | A1 | 6/2014 | Ebersold |
| 2015/0134249 | A1* | 5/2015 | Yen ......................... G01C 21/20 701/541 |
| 2015/0155730 | A1* | 6/2015 | Miller ................... H02J 7/0045 320/114 |

OTHER PUBLICATIONS

"WiTricity Products", WiTricity, Accessed Apr. 10, 2014, pp. 1-2.
"WiTricity is More Than", WiTricity, Accessed Apr. 10, 2014, pp. 1-2.

* cited by examiner

WEARABLE MOBILE DEVICE CHARGER

PRIORITY CLAIM

This patent application claims priority to U.S. Provisional Patent No. 61/837,177 entitled "WRIST MOUNTED SOLAR BATTERY CHARGER ILLUMINATION DEVICE" to Boysen III. filed on Jun. 20, 2013 and to U.S. Provisional Patent No. 61/929,105 entitled "WEARABLE WIRELESS ENERGY TRANSFER SOURCE" to Boysen III et al. filed on Jan. 19, 2014.

BACKGROUND

1. Field of the Invention

The present invention relates to a wearable device for charging electronic devices. More particularly, the invention relates to a wearable device that converts ambient energy to electrical energy, stores the electrical energy, and wirelessly charges electronic devices in proximity to the wearable device using the stored electrical energy.

2. Description of Related Art

The ability to conveniently recharge a mobile device (e.g., wireless device) when needed has become more and more desirable as the popularity, usage, and sophistication of wireless devices increases. For example, users increasingly use their mobile devices for power draining processes such as data transmission and taking video and/or photographs. While battery technology is continuously being explored to provide longer batter lifes, people still often find the need to charge their mobile devices in situations where there is no easy charging means available. Thus, there has been motivation to provide portable charging systems. Most current solutions involve wired charging of the mobile device (e.g., connecting a USB-type cable to the mobile device). Using wired charging may, however, be cumbersome and make continuous use of the device difficult. Therefore, the ability to charge a mobile device without wires or physical connections may be useful in a variety of situations (e.g., at events or gatherings).

Additionally, in some situations, lighting devices may also be useful for enhanced visibility, performance, and/or security. For example, law enforcement officers often use flashlights in dark hours for viewing and/or identification purposes. While handheld flashlights are often used, these may occupy the officer's hand and thus, does not allow "hands free" light operation. In addition, many lighting devices require charging or battery replacement. Wireless charging of the light device may be useful to ensure that the lighting device is substantially always ready for use.

Many wrist mounted illuminating devices have been disclosed. U.S. Pat. No. 4,521,832 to Barbour; U.S. Pat. No. 4,788,631 to Fuller; U.S. Pat. No. 4,812,953 to Ask; U.S. Pat. No. 5,568,971 to Jewell; U.S. Pat. No. 6,213,619 to Yu; U.S. Pat. No. 6,578,982 to Lynch; and U.S. Patent Appl. Pub. No. 2011/0310592 to Smith, each of which is incorporated by reference as if fully set forth herein, disclose many different types of wrist mounted illumination devices. These devices, however, fail to provide a lightweight, ambiently charged, wrist mounted illumination device that provides desirable directed light. Additionally, these devices do not provide any means for charging a mobile device.

SUMMARY

In certain embodiments, a wireless charging device includes a wristband wearable on a user's wrist. One or more energy collection components may be located on the wristband. The energy collection components may collect ambient energy and convert the ambient energy to electrical energy. One or more energy storage components located on the wristband and electrically coupled to the energy collection components may store at least some of the electrical energy from the energy collection components. One or more energy transmission components may be located on the wristband and electrically coupled to the energy collection components and the energy storage components. The energy transmission components may wirelessly couple with a mobile device to wirelessly transmit at least some of the collected electrical energy to the mobile device for charging a battery on the mobile device.

In certain embodiments, a wireless charging device includes a wristband wearable on a user's wrist. One or more energy collection components may be located on the wristband. The energy collection components may collect ambient energy and convert the ambient energy to electrical energy. One or more energy storage components may be located on the wristband and wirelessly coupled to the energy collection components. The energy storage components may wirelessly receive and store at least some of the electrical energy from the energy collection components. One or more energy transmission components may be located on the wristband and electrically coupled to the energy storage components. The energy transmission components may electrically couple with a mobile device to transmit at least some of the collected electrical energy to the mobile device for charging a battery on the mobile device.

In certain embodiments, a wireless charging device includes a wristband wearable on a user's wrist. At least one magnetic coil may be located on the wristband. The at least one magnetic coil may receive electrical energy. One or more energy storage components may be located on the wristband and directly connected to the at least one magnetic coil. The energy storage components may receive and store at least some of the electrical energy received by the at least one magnetic coil. One or more energy transmission components may be located on the wristband and electrically coupled to the energy storage components. The energy transmission components may electrically couple with a mobile device to transmit at least some of the collected electrical energy to the mobile device for charging a battery on the mobile device.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

In the context of this patent, the term "coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner.

In the context of this patent, the term "mobile device" refers to any wireless electronic device that utilizes mobile connection technology (e.g., cellular, satellite, or wireless technology). Examples of mobile devices include, but are not limited to, cellular phones, smart cellular phones, PDAs, computer tablets, GPS units, radios, mobile lighting solutions, and gaming devices.

Figure 1:
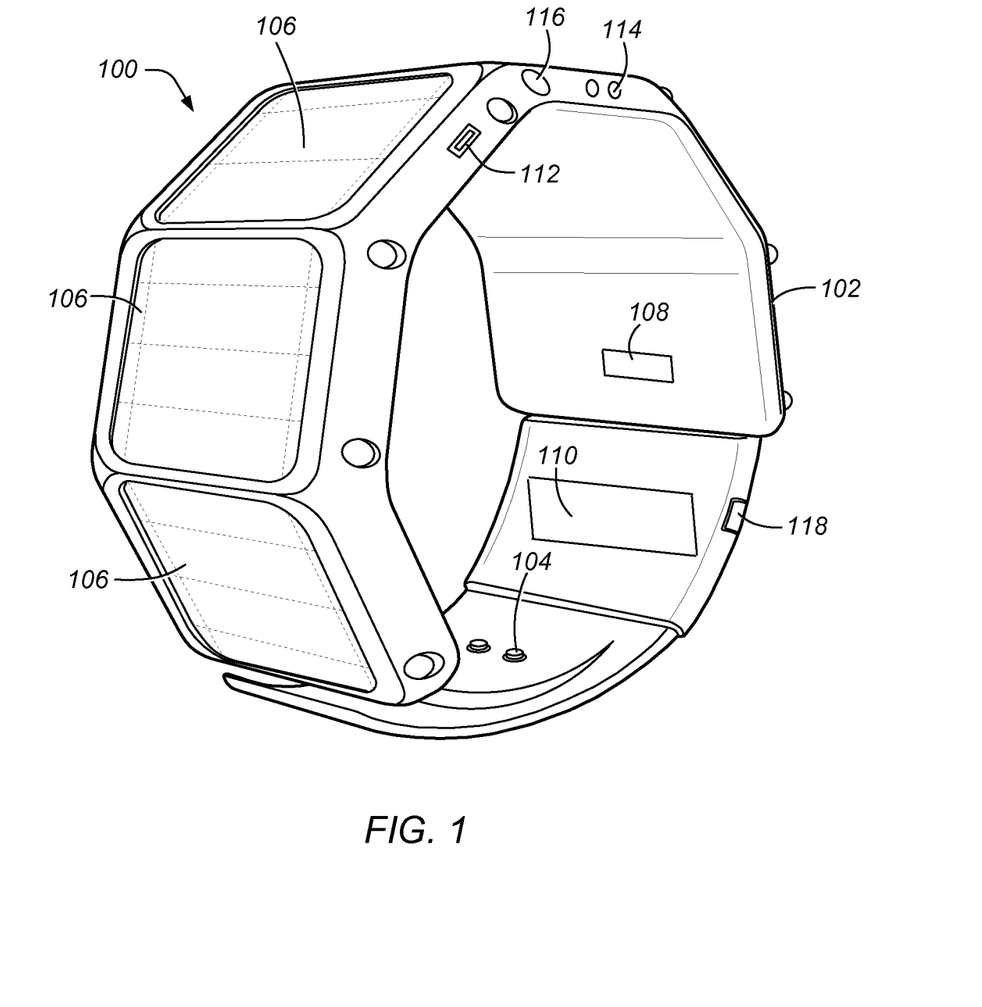
FIG. 1 depicts a perspective view of an embodiment of a wireless charging device.
Figure 2:
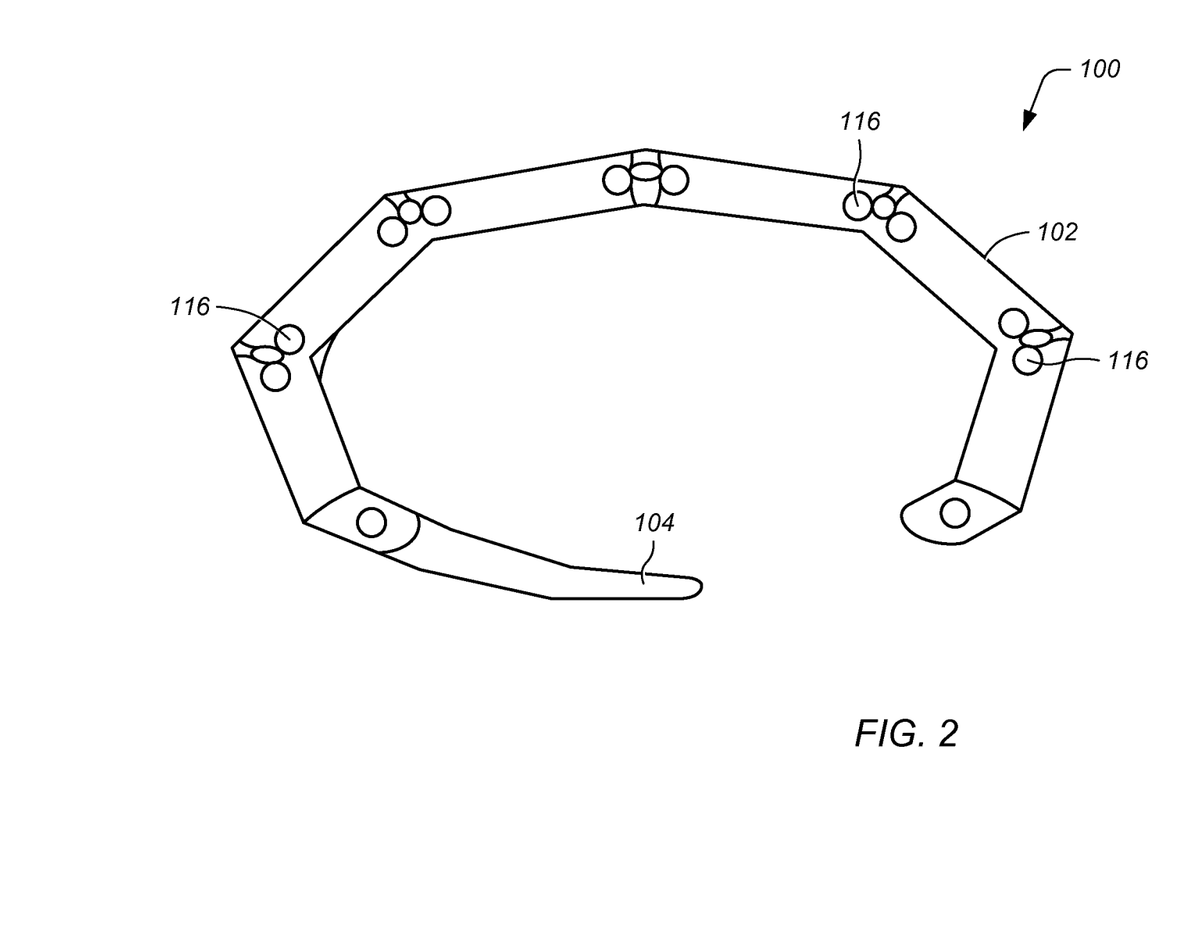
FIG. 2 depicts a front end view of an embodiment of a wireless charging device.

FIG. 1 depicts a perspective view of an embodiment of wireless charging device 100. FIG. 2 depicts a front end view of an embodiment of wireless charging device 100. In certain embodiments, device 100 includes wristband 102. In certain embodiments, wristband 102 is any band or similar structure that is wearable on the wrist of a user (e.g., a human or animal). Wristband 102 may, however, include any band or structure that is wearable on any part of a human body or an animal body to allow the user to portably transport device 100. Wristband 102 may be made of any material suitable for providing a strong and resilient wristband that is comfortable for a user to wear on the user's wrist. For example, wristband may be made of hard, flexible plastic materials such as those used in fitness trackers or fitness watches. In some embodiments, wristband 102 includes waterproof, water resistant, and/or dustproof materials.

In certain embodiments, wristband 102 includes fastener 104. Fastener 104 may be any fastener known in the art to allow device 100 to be securely placed on the user's wrist when fastened (e.g., closed). Fastener 104 may be unfastened (e.g., opened) to allow device 100 to be removed from the user's wrist. Fastener 104 may include, but not be limited to, snap buttons, Velcro®, any magnetized type fastener, or any wristwatch type fastener.

In certain embodiments, device 100 includes one or more energy collection components 106 located on wristband 102. Energy collection components 106 may be located around the perimeter of wristband 102. The number of energy collection components 106 in device 100 may be selected as needed depending on, for example, the charging, storing, or power requirements of the device. In some embodiments, energy collection components 106 are embedded in wristband 102 around the perimeter of the wristband.

In certain embodiments, energy collection components 106 include any components capable of collecting ambient energy from the environment surrounding wristband 102 and converting the ambient energy to electrical energy. Ambient energy may include, for example, energy that occurs from natural and/or human-made sources that surround wristband 102 and the user (e.g., wearer of the wristband) in an everyday environment (e.g., ambient energy includes different types of energies from the user's surrounding environment that are generally available). Ambient energy types that may be collected and converted into electrical energy by energy collection components 106 include, but are not limited to, mechanical energy, thermal energy, electrical energy, and electromagnetic radiation (including photon (light) radiation).

In certain embodiments, energy collection components 106 include photovoltaic components or other components capable of collecting light energy (e.g., visible, infrared, or ultraviolet light) and/or solar energy and converting the light energy to electrical energy. For example, energy collection components 106 may include solar energy collection components (e.g., solar cells).

In some embodiments, energy collection components 106 include piezoelectric collection components that collect vibrational energy and convert the collected energy to electrical energy. In some embodiments, energy collection components 106 include thermoelectric collection components that collect energy based on differences in temperature and convert the collected energy to electrical energy. In some embodiments, energy collection components 106 include pyroelectric collection components that collect energy as they are heated or cooled and convert the collected energy to electrical energy. In some embodiments, energy collection components 106 include electrostatic collection components that collect energy based on changing capacitance of vibration-dependent variable capacitors (e.g., "varactors") and convert the collected energy to electrical energy.

In some embodiments, energy collection components 106 include electromagnetic induction collection components that collect energy based the production of a potential difference (voltage) across a conductor when the conductor is exposed to a varying magnetic field and convert the collected energy to electrical energy. In some embodiments, energy collection components 106 include resonant inductive coupling collection components that collect energy based near field wireless transmission of electrical energy between two coils that are tuned to resonate at the same frequency and convert the collected energy to electrical energy. Resonant tuning of the two coils may, for example, include balancing the coils to become resonant. Balancing of the coils may be dependent on the inductance and the capacitance of the coils.

In some embodiments, energy collection components 106 include metamaterial collection components that collect energy by converting wireless signals to direct current and convert the collected energy to electrical energy. For example, a metamaterial may wirelessly collect and convert a microwave signal to a direct current voltage. In some embodiments, energy collection components 106 include electro active polymer collection components that collect energy based on potential mechanical energy stored in the configuration of a material or physical system as work is performed to distort the materials volume or shape and convert the collected energy to electrical energy. In some embodiments, energy collection components 106 include nanogenerator collection components that collect electrical energy by converting mechanical/thermal energy as produced by small-scale physical changes to electrical energy.

In some embodiments, energy collection components 106 include energy collection components capable of using body energy (e.g., body heat and/or body perspiration) to produce electrical energy. For example, energy collection components 106 may produce electrical energy using a salinity gradient generated by salt or other elements in body perspiration and collect the produced electrical energy.

In certain embodiments, device 100 includes one or more energy storage components 108 located on wristband 102. Energy storage components 108 may be electrically coupled to energy collection components 106. In certain embodiments, the electrical energy collected and/or the energy converted to electrical energy by energy collection components 106 is provided to energy storage components 108. Energy storage components 108 may store the electrical energy for use by device 100. Energy storage components 108 may be any component capable of storing and releasing electrical energy. For example, energy storage components 108 may include, but not be limited to, capacitors, super capacitors, and rechargeable batteries (e.g., Li-ion batteries).

In certain embodiments, device 100 includes one or more energy transmission components 110 located on wristband 102. Energy transmission components 110 may be electrically coupled to energy collection components 106 and/or energy storage components 108. Energy transmission components 110 may include components capable of transmitting or providing electrical energy to another (external) device coupled to device 100 through either a wired or a wireless connection. For example, energy transmission components 110 may transmit or provide electrical energy to a mobile device for charging the mobile device (e.g., electrical energy is provided to charge a battery of the mobile device) through either a wired or a wireless connection.

In some embodiments, energy transmission component 110A is a port connection for providing a wired connection to an external device (e.g., a mobile device). The port connection may be, for example, a USB-type connection, such as a min-USB connection, or a similar cable connection compatible with a charging cable used for the external device. The port connection may provide a wired connection (e.g., a direct connection) between energy transmission components 110 and the external device when the charging cable for the external device is connected to the port connection. Thus, the port connection allows charging of the external device with stored electrical energy from energy storage components 108 or electrical energy provided directly from energy collection components 106 through the wired (direct) connection.

In certain embodiments, energy transmission components 110 wirelessly provide or transmit electrical energy to the external device. For example, energy transmission components 110 may include magnetic coils or other inductive coupling components capable of wirelessly transmitting electrical energy. The external device may include or be attached to similar components capable of receiving the transmitted electrical energy. Thus, the external device may be charged with stored electrical energy from energy storage components 108 or electrical energy provided directly from energy collection components 106 through a wireless (e.g., indirect or non-contact) connection.

Figure 3:
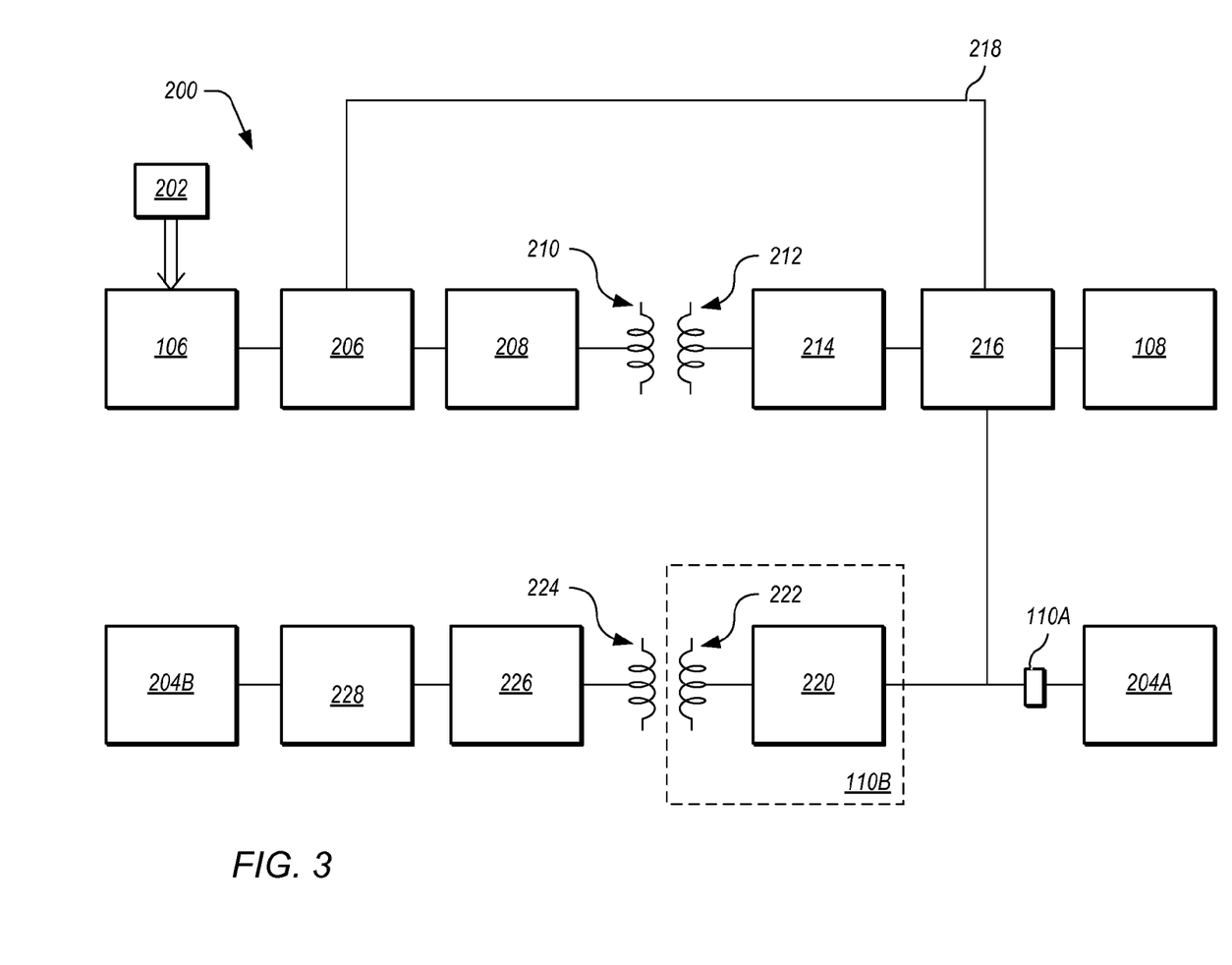
FIG. 3 depicts an embodiment of a schematic for power (electrical energy) collection and transmission using a wireless charging device.

FIG. 3 depicts an embodiment of a schematic for power (electrical energy) collection and transmission using device 100. Power collection and transmission scheme 200 may include collecting energy and providing electrical energy to external load 204A through a wired connection or to external load 204B through a wireless connection. External loads 204A, 204B may be, for example, an external device such as a mobile device.

In certain embodiments, energy collection components 106 collect energy 202. Energy 202 may be either ambient energy that is converted to electrical energy or electrical energy that is collected directly. In some embodiments, energy collection components 106 provide collected electrical energy to buck/boost component 206. Buck/boost component 206 may have a direct (e.g., wired) connection to energy collection components 106. As shown in FIG. 3, direct (wired) connections in scheme 200 are represented by solid lines (e.g., the solid line between energy collection components 106 and buck/boost component 206). Buck/boost component 206 may be, for example, a step up/step down boost converter that changes the voltage of the electrical energy to a suitable voltage (e.g., a specification voltage) for providing electrical energy to energy storage components 108 and/or energy transmission components 110 (e.g., energy transmission component 110A or energy transmission component 110B). In some embodiments, a charge pump may be used in combination with buck/boost component 206 to provide the suitable voltage.

In certain embodiments, electrical energy is provided to either energy storage components 108 or directly to energy transmission components 110 from energy collection components 106 and/or buck/boost component 206 using a wireless connection. For example, electrical energy may be transferred between components in scheme 200 using electromagnetic induction. For wireless electrical energy transfer, as shown in FIG. 3, electrical energy from buck/boost component 206 may be provided to oscillator 208. Oscillator 208 may convert the electrical energy from direct current (DC) to alternating current (AC). Oscillator 208 may then provide AC electrical energy to magnetic coil 210.

Figure 4A:
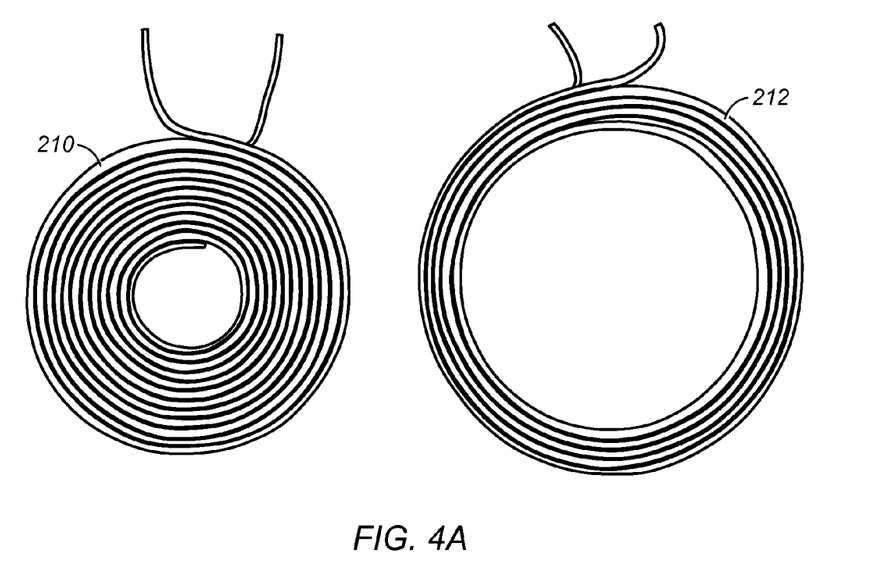
FIG. 4A depicts a representation of an embodiment of loop magnetic coils.
Figure 4B:
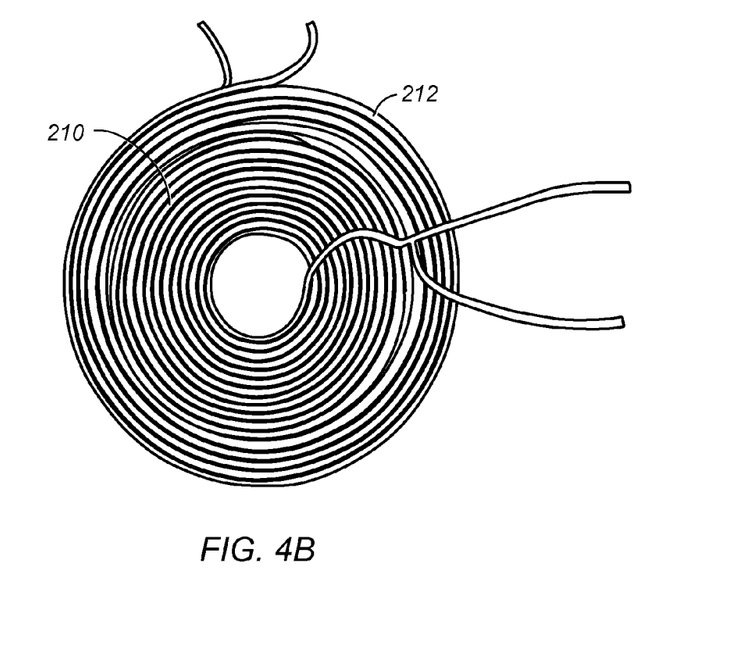
FIG. 4B depicts a representation of an embodiment of a loop magnetic coil placed inside another loop magnetic coil.

In certain embodiments, magnetic coil 210 is inductively coupled to magnetic coil 212. In some embodiments, magnetic coil 210 is a looped coil placed inside magnetic coil 212, also a looped coil (e.g., magnetic coil 210 is a smaller loop placed inside the larger loop of magnetic coil 212). FIG. 4A depicts a representation of an embodiment of loop magnetic coil 210 and loop magnetic coil 212. FIG. 4B depicts a representation of an embodiment of loop magnetic coil 210 placed inside loop magnetic coil 212. Placing the loop of magnetic coil 210 inside the loop of magnetic coil 212 inductively couples the coils. With the inductive coupling, electrical energy from oscillator 208 may be transmitted by magnetic coil 210 and received by magnetic coil 212, as shown in FIG. 3.

Magnetic coil 212 may be coupled to rectifier 214. Rectifier 214 may convert the received electrical energy from AC to DC. The DC electrical energy may then be provided to voltage regulator 216. In certain embodiments, voltage regulator 216 provides the received (DC) electrical energy to energy storage components 108 (e.g., for storing the electrical energy). In some embodiments, voltage regulator 216 provides the received (DC) electrical energy directly to energy transmission components 110 (e.g., energy transmission component 110A or energy transmission component 110B). As energy storage components 108 and energy transmission components 110 are coupled to energy collection components 106 using magnetic coils 210, 212, which are inductively coupled, the energy storage and energy transmission components are electrically coupled to the energy collection components without any wiring directly connecting the components (e.g., the components are inductively or wirelessly coupled).

In some embodiments, magnetic coil 212 is designed to also receive electrical energy from the ambient environment and provide the electrical energy directly to rectifier 214 and voltage regulator 216. For example, magnetic coil 212 may be designed as an antenna that picks up or absorbs ambient radiation (e.g., electromagnetic radiation from radio or television signals) from the surrounding environment and/or the magnetic coil may generate energy from temperature gradients.

In some embodiments, electrical energy is provided to either energy storage components 108 or directly to energy transmission components 110 (e.g., energy transmission component 110A or energy transmission component 110B) from energy collection components 106 and/or buck/boost component 206 using a wired (e.g., direct) connection. For example, buck/boost components 206 may be directly connected to voltage regulator 216 through wired connection 218. Using wired connection 218, electrical energy from energy collection components 106 may be provided directly to energy storage components 108 and/or energy transmission components 110.

In some embodiments, electrical energy is provided to an external load using a direct (wired) connection. For example, as shown in FIG. 3, external load 204A may receive electrical energy from energy transmission component 110A. Energy transmission component 110A may include a port (wired) connection for electrically coupling to external load 204A. Connecting external load 204A to the port connection of energy transmission component 110A (e.g., connecting a charging cable to the port connection) provides the wired (direct) connection for transmission of electrical energy.

In certain embodiments, electrical energy is provided to an external load using an indirect (wireless) connection. For example, as shown in FIG. 3, external load 204B may receive electrical energy from energy transmission component 110B. Energy transmission component 110B may include components used for wireless (e.g., electromagnetic induction or resonant inductive coupling) transfer of energy to external load 204B. In certain embodiments, as shown in FIG. 3, energy transmission component includes oscillator 220 and magnetic coil 222. Oscillator 220 may convert the electrical energy from DC to AC. Oscillator 220 may then provide AC electrical energy to magnetic coil 222.

In certain embodiments, magnetic coil 222 is coupled to magnetic coil 224 using electromagnetic induction. For example, magnetic coil 222 and magnetic coil 224 may be looped coils inductively coupled substantially similarly to magnetic coil 210 and magnetic coil 212, shown in FIGS. 4A-B. With the inductive coupling, electrical energy from oscillator 220 may be transmitted by magnetic coil 222 and received by magnetic coil 224, as shown in FIG. 3.

In certain embodiments, magnetic coil 222 is coupled to magnetic coil 224 using resonant inductive coupling. Resonant inductive coupling may include tuning magnetic coil 222 and magnetic coil 224 to resonate at substantially the same frequency. Resonant tuning of magnetic coil 222 and magnetic coil 224 may, for example, include balancing the coils to become resonant. Balancing of the coils may be dependent on the inductance and the capacitance of the coils. Once magnetic coil 222 and magnetic coil 224 are tuned to resonate, energy transfer between the coils may occur using energy based near field wireless transmission of electrical energy between the two coils.

Using either the electromagnetic induction or the resonant inductive coupling methods described above, magnetic coil 224 may be coupled to rectifier 226. Rectifier 226 may convert the received electrical energy from AC to DC. The DC electrical energy may then be provided to voltage regulator 228. In certain embodiments, voltage regulator 228 provides the received (DC) electrical energy to external load 204B. In some embodiments, magnetic coil 224, rectifier 226, and/or voltage regulator 228 are provided as attachments to external load 204B (e.g., they are connected externally to the external load 204B). In some embodiments, magnetic coil 224, rectifier 226, and/or voltage regulator 228 are included in external load 204B (e.g., they are components built-in to the external load).

As described above, in certain embodiments, energy transmission component 110B transfers electrical energy to external load 204B using either electromagnetic induction or resonant inductive coupling. These two energy transfer methods provide a wireless transfer of electrical energy. Thus, energy transmission component 110B provides a wireless connection for transfer of electrical energy to external load 204B (using one or more additional components connected to or included as part of the external load). Providing the wireless connection for energy transfer allows external load 204B to be charged when in proximity to wristband 102 (e.g., there does not have to be physical contact between the external load and the wristband). For example, with resonant inductive coupling, charging of external load 204B may occur at distances of up to about 6". Charging external load 204B (e.g., the mobile device) using energy transmission component 110B on device 100 allows the user to easily and conveniently charge his/her mobile device without the need for attaching a wire to the mobile device. Thus, the user is readily able to charge his/her mobile device in any situation where wristband 102 may be worn (e.g., at an event or gathering).

In some embodiments, device 100 includes a magnetic attachment for attaching to the external load (e.g., the mobile device). For example, device 100 may include a magnet that couples to a magnet in the external load to couple the external load to the device. The magnetic force of the attachment may be secure enough to allow rotation of the external load (e.g., mobile device) without the external load becoming unattached from device 100. In some embodiments, the magnetic attachment in device 100 is provided in combination with, or a part of, the electromagnetic induction or resonant inductive coupling system. For example, magnetic coil 222 may generate a magnetic field that provides the magnetic attachment for the external load.

In certain embodiments, device 100 includes one or more power level indicators 114, as shown in FIG. 1. Power level indictators 114 may be illuminated power level indicators. For example, power level indicators 114 may include, but not be limited to, one or more light-emitting diodes (LEDs), a digital screen, or via projected lights. Power level indicators 114 may be connected to (e.g., directly connected to) energy storage components 108 and provide visual indication of the charge/uncharge state of the energy storage components. In some embodiments, power level indicators 114 may transmit (e.g., indicate) and/or receive iterative levels of power in energy storage components 108. For example, power level indicators 114 may provide indication of charging of an external load from energy storage components 108 (e.g., when power is being drained from the energy storage components).

In certain embodiments, device 100 includes one or more light emitting components 116 on wristband 102, as shown in FIGS. 1 and 2. Light emitting components 116 may be, for example, LEDs or other low power light emitting elements. In some embodiments, each of light emitting components 116 have substantially the same intensity. In some embodiments, the intensity of light emitting components 116 is varied between two or more of the light emitting components. Light emitting components 116 may be embedded in wristband 102. In certain embodiments, light emitting components 116 are forward facing on wristband 102 to provide light in a forward direction for the user (e.g., towards and beyond the hand of the user). Light emitting components 116 may be oriented, however, in any direction depending on, for example, a desired use of device 100. Additionally, the number, location, and/or intensity of light emitting components 116 may be varied depending on the desired use of the device.

In certain embodiments, device 100 includes switch 118. Switch 118 may be used to control light emitting components 116 (e.g., turn on/off the light emitting components). In some embodiments, switch 118 includes an LED light controller. The LED light controller may be used, for example, to turn on/off light emitting components 116 and/or to vary the intensity and/or light pattern emitted by the light emitting components. For example, the LED light controller may be used to flash light emitting components 116 in a pattern or sequence (e.g., flash in a pattern to provide an SOS signal).

Figure 5:
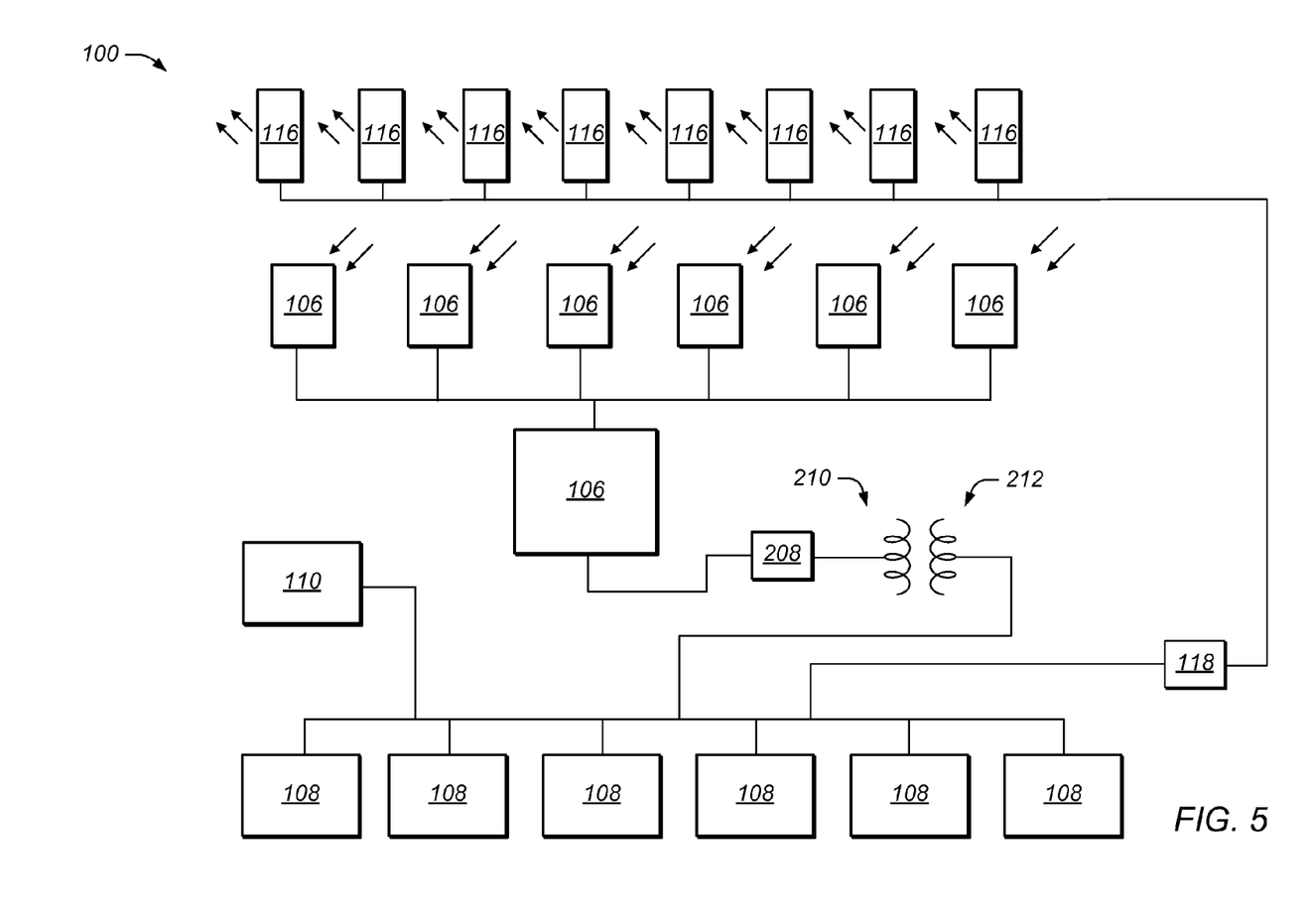
FIG. 5 depicts a representation of an embodiment of a circuit diagram for a wireless charging device.

FIG. 5 depicts a representation of an embodiment of a circuit diagram for device 100. As shown in FIG. 5, device 100 may include energy collection components 106, oscillator 208, magnetic coils 210, 212, energy storage components 108, energy transmission component 110, light emitting components 116, and switch 118. In certain embodiments, light emitting components 116 are coupled together in parallel. Coupling light emitting components 116 in parallel may reduce the power drain from energy storage components 108 when the light emitting components are powered on. Reducing the power drain by light emitting components 116 may provide longer, sustained operation of the light emitting components in situations where it may be difficult to recharge energy storage components 108 (e.g., when in dark environments and energy collection is through solar collection). Reducing the power drain by light emitting components 116 may also allow simultaneous charging of an external load through energy transmission component 110.

In certain embodiments, device 100 and its included components (e.g., the components on wristband 102) are enclosed or contained in the wristband such that the components are protected from dust and/or moisture. For example, the components may be embedded, enclosed, contained, or otherwise protected to be dustproof and/or waterproof.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a capacitor" includes a combination of two or more capacitors and reference to "a material" includes mixtures of materials.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A wireless charging device, comprising:
a wristband wearable on a user's wrist;
one or more energy collection components located on the wristband, wherein the energy collection components are configured to collect ambient energy and convert the ambient energy to electrical energy;
one or more energy storage components located on the wristband and electrically coupled to the energy collection components, wherein the energy storage components are configured to store at least some of the electrical energy from the energy collection components; and
one or more energy transmission components located on the wristband and electrically coupled to the energy collection components and the energy storage components, wherein at least one of the energy transmission components comprises an oscillator and a first magnetic coil, the oscillator being configured to receive electrical energy as direct current electrical energy and configured to convert the direct current electrical energy to alternating current electrical energy and provide the alternating current electrical energy to the first magnetic coil, and wherein the first magnetic coil is configured to wirelessly couple with a second magnetic coil attached to the battery of a mobile device to wirelessly couple the energy transmission component with the mobile device, the first magnetic coil being configured to wirelessly transmit at least some of the alternating current electrical energy to the mobile device.

2. The device of claim 1, wherein the energy transmission components are configured to wirelessly transmit at least some of the electrical energy stored in the energy storage components to the mobile device for charging the battery on the mobile device.

3. The device of claim 1, wherein the energy transmission components are configured to wirelessly transmit at least some of the electrical energy directly from the energy collection components to the mobile device for charging the battery on the mobile device.

4. The device of claim 1, wherein the first magnetic coil and the second magnetic coil are tuned to resonate at a same frequency such that the at least one energy transmission component wirelessly transmits at least some of the alternating current electrical energy to the mobile device by resonant inductive coupling.

5. The device of claim 1, wherein the first magnetic coil and the second magnetic coil are inductively coupled such that the at least one energy transmission component wirelessly transmits at least some of the alternating current electrical energy to the mobile device by magnetic inductance.

6. The device of claim 1, wherein at least one of the energy storage components is configured to wirelessly receive electrical energy from at least one of the energy collection components.

7. The device of claim 1, wherein at least one of the energy collection components comprises a solar energy collection component.

8. The device of claim 1, wherein at least one of the energy storage components comprises a battery, a capacitor, or another storage medium.

9. The device of claim 1, further comprising at least one illuminated power level indicator located on the wristband, wherein the at least one illuminated power level indicator is configured to provide an output indicative of a power level of at least one of the energy storage components.

10. The device of claim 1, further comprising one or more electrical circuit components coupled to the energy collection components, wherein the electrical circuit components are configured to control a voltage of the electrical energy provided to the energy storage components.

11. The device of claim 1, wherein the mobile device is configured to convert the alternating current electrical energy to direct current electrical energy on the mobile device.

12. A wireless charging device, comprising:
a wristband wearable on a user's wrist;
one or more energy collection components located on the wristband, wherein the energy collection components are configured to collect ambient energy and convert the ambient energy to electrical energy;
one or more energy storage components located on the wristband and wirelessly coupled to the energy collection components, wherein the energy storage components are configured to wirelessly receive and store at least some of the electrical energy from the energy collection components; and
one or more energy transmission components located on the wristband and electrically coupled to the energy storage components, wherein the energy transmission components are configured to electrically couple with a mobile device to transmit at least some of the collected electrical energy to the mobile device.

13. The device of claim 12, wherein the energy storage components are wirelessly coupled to the energy collection components using at least one pair of inductively coupled magnetic coils, wherein a first magnetic coil in the pair of inductively coupled magnetic coils is directly connected to at least one of the energy collection components and a second magnetic coil in the pair of inductively coupled magnetic coils is directly connected to at least one of the energy storage components, and wherein the first magnetic coil and the second magnetic coil are inductively coupled such that the at least one energy collection component wirelessly transmits at least some of the electrical energy to the at least one energy storage component by magnetic inductance.

14. The device of claim 12, wherein the energy transmission components are configured to wirelessly couple with the mobile device to wirelessly transmit at least some of the collected electrical energy to the mobile device for charging a battery on the mobile device.

15. The device of claim 12, wherein at least one of the energy transmission components comprises a port connection, wherein the port connection provides a wired connection for charging the battery on the mobile device.

16. The device of claim 12, further comprising a plurality of light emitting components embedded in an outer front edge of the wristband, wherein the light emitting components are powered by at least some of the electrical energy stored in the energy storage components.

17. The device of claim 16, further comprising at least one switch coupled to the energy storage components and the energy transmission components, wherein the switch is configured to control power transmission to at least one of the plurality of light emitting components.

18. A wireless charging device, comprising:
a wristband wearable on a user's wrist;
at least one magnetic coil located on the wristband, wherein the at least one magnetic coil is configured to receive electrical energy;
one or more energy storage components located on the wristband and directly connected to the at least one magnetic coil, wherein the energy storage components are configured to receive and store at least some of the electrical energy received by the at least one magnetic coil; and
one or more energy transmission components located on the wristband and electrically coupled to the energy storage components, wherein at least one energy transmission component is wirelessly coupled to the at least one magnetic coil, the at least one energy transmission component being configured to wirelessly receive at least some of the electrical energy from the at least one magnetic coil, and wherein the energy transmission components are configured to electrically couple with a mobile device to transmit at least some of the collected electrical energy to the mobile device.

19. The device of claim 18, further comprising a second magnetic coil electrically coupled to at least one energy collection component, wherein the second magnetic coil is inductively coupled to the at least one magnetic coil, and wherein the second magnetic coil is configured to provide electrical energy to the at least one magnetic coil through electromagnetic induction.

20. The device of claim 18, wherein the at least one magnetic coil is configured to receive at least some electrical energy from ambient energy sources.

* * * * *